(12) United States Patent
Li et al.

(10) Patent No.: US 10,579,767 B1
(45) Date of Patent: Mar. 3, 2020

(54) SYSTEMS AND METHODS FOR ROUTING A CLOCK NET WITH MULTIPLE LAYER RANGES

(71) Applicant: Cadence Design Systems, Inc., San Jose, CA (US)

(72) Inventors: Zhuo Li, Austin, TX (US); Wen-Hao Liu, Cedar Park, TX (US); Gracieli Posser, Austin, TX (US); Charles Jay Alpert, Cedar Park, TX (US); Ruth Patricia Jackson, Cambridge (GB)

(73) Assignee: Cadence Design Systems, Inc., San Jose, CA (US)

( * ) Notice: Subject to any disclaimer, the term of this patent is extended or adjusted under 35 U.S.C. 154(b) by 9 days.

(21) Appl. No.: 15/640,999

(22) Filed: Jul. 3, 2017

(51) Int. Cl.
*G06F 17/50* (2006.01)

(52) U.S. Cl.
CPC ...... *G06F 17/5077* (2013.01); *G06F 17/5081* (2013.01); *G06F 2217/06* (2013.01)

(58) Field of Classification Search
USPC ........................................................ 716/126
See application file for complete search history.

(56) References Cited

U.S. PATENT DOCUMENTS

| 8,261,226 B1* | 9/2012 | Becker | G06F 17/5077 716/118 |
| 2012/0240093 A1* | 9/2012 | Alpert | G06F 17/5031 716/129 |
| 2014/0157221 A1* | 6/2014 | Peyer | G06F 17/5077 716/129 |
| 2015/0213178 A1* | 7/2015 | Lin | G06F 17/5077 716/123 |
| 2018/0032660 A1* | 2/2018 | Lin | G06F 17/5077 |

* cited by examiner

*Primary Examiner* — Eric D Lee
(74) *Attorney, Agent, or Firm* — Schwegman Lundberg & Woessner, P.A.

(57) ABSTRACT

Various embodiments provide for routing a net of a circuit design using multiple layer ranges. In particular, some embodiments route a net of a circuit design using multiple layer ranges by performing routing of the net over multiple iterations such that at each iteration, a layer bound of a layer range is gradually adjusted (e.g., relaxed) based on wirelength, wire detour, or congestion of a routing result of a prior iteration. For instance, some embodiments may gradually relax a layer bound of the layer range by increasing a layer upper bound or decreasing a layer lower bound.

15 Claims, 9 Drawing Sheets

200

| 202 | Receive a Set of Routing Parameters Including a Layer Range |

| 204 | Iteratively Route a Network of a Circuit Design Based on the Layer Range, Where at each Iteration the Layer Range is Relaxed by Increasing a Layer Upper Bound of the Layer Range or Decreasing a Layer Lower Bound of the Layer Range |

| 206 | Proceed with Layer Assignment for the Circuit Design Based on the Layer Range |

SYSTEMS AND METHODS FOR ROUTING A CLOCK NET WITH MULTIPLE LAYER RANGES

TECHNICAL FIELD

Embodiments described herein relate to circuit design and, more particularly, to systems, methods, devices, and instructions for routing a net of a circuit design using multiple layer ranges, which may be part of electronic design automation (EDA).

BACKGROUND

Electronic design automation (EDA) software systems commonly perform routing of networks of circuit designs, such as clock networks (hereafter, clock nets). Such net routing may be performed using all possible layers (e.g., metal layers) of the circuit design (e.g., full three-dimensional (3D) global routing), but this can result in a slow routing process and no control of quality (e.g., of a clock signal provided by a clock net). Alternatively, net routing may be performed using a predefined range of layers (e.g., between metal layer eight (M8) and metal layer nine (M9)), but strict routing between a predefined range of layers can result in congestion, long wirelength, increased power usage, or lower Quality of Result (QOR).

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for routing a net of a circuit design using multiple layer ranges. More particularly, some embodiments route a net of a circuit design using multiple layer ranges by performing routing of the net over multiple iterations such that at each iteration, a layer bound of a layer range is gradually adjusted (e.g., relaxed) based on wirelength, wire detour, or congestion (e.g., in view of a wirelength, wire detour, or congestion threshold) of a routing result (e.g., routed circuit design) of a prior iteration. For instance, some embodiments may gradually relax a layer bound of the layer range by increasing the layer upper bound or decreasing the layer lower bound. In this way, various embodiments can auto-expand the predefined layer range based on wirelength, wire detour, or congestion, and, in this way, a layer assignment stage (of a net routing process) can use a relaxed layer range (in place of the original predefined layer range) to gradually explore the full range of layers of the circuit design in an efficient manner. Additionally, in this way, various embodiments can reduce congestion, reduce wirelength, reduce via, reduce power usage, or improve Quality of Result (QOR) over traditional net routing methods. Various embodiments described herein are particularly useful for routing or layer assignment for a clock net of a circuit design. Generally speaking, various embodiments leverage the fact that it is not necessary for every segment of wire (or edge) of a circuit design to adhere to the predefined layer range.

Further, various embodiments provide for routing a net by automatically demoting an edge of a net (e.g., a clock net) to a lower layer when the edge is near a sink (e.g., of the clock net). Some such embodiments may facilitate the layer demotion with a number-labeling approach, as described herein with respect to FIG. 3. Some such embodiments can also reduce at least one of via, capacitance, slew, latency, power usage, or congestion over traditional net routing methods.

Furthermore, various embodiments increase a via routing cost during a layer assignment stage of net routing to cause preference of continuous wire connections on high layers of a circuit design. By preferring high layers of the circuit design for edges, such embodiments cause resistance-capacitance for those edges to be improved. As used herein, resistance-capacitance can refer to a resistance-capacitance product or a unit delay of an edge/wire.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
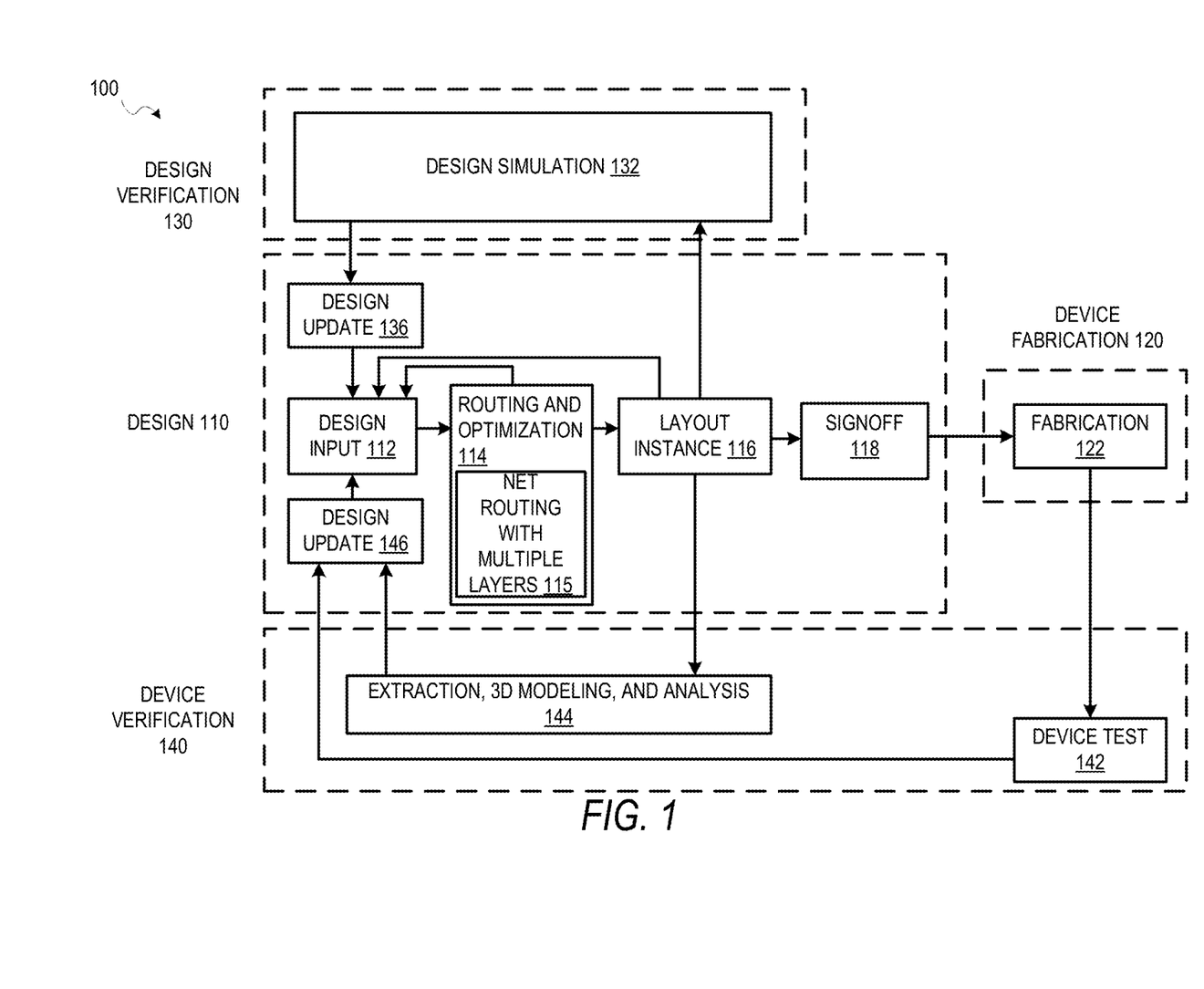
FIG. 1 is a diagram illustrating an example design process flow for routing a network (hereafter, net) of a circuit design with multiple layer ranges, according to some embodiments.

FIG. 1 is a diagram illustrating an example design process flow 100 for routing a net of a circuit design with multiple layer ranges, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes a net routing with multiple layers 115 operation, which may be performed in accordance with various embodiments described herein. While the design process flow 100 shows optimization occurring prior to a layout instance 116, routing (e.g., the net routing with multiple layers 115 operation), timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
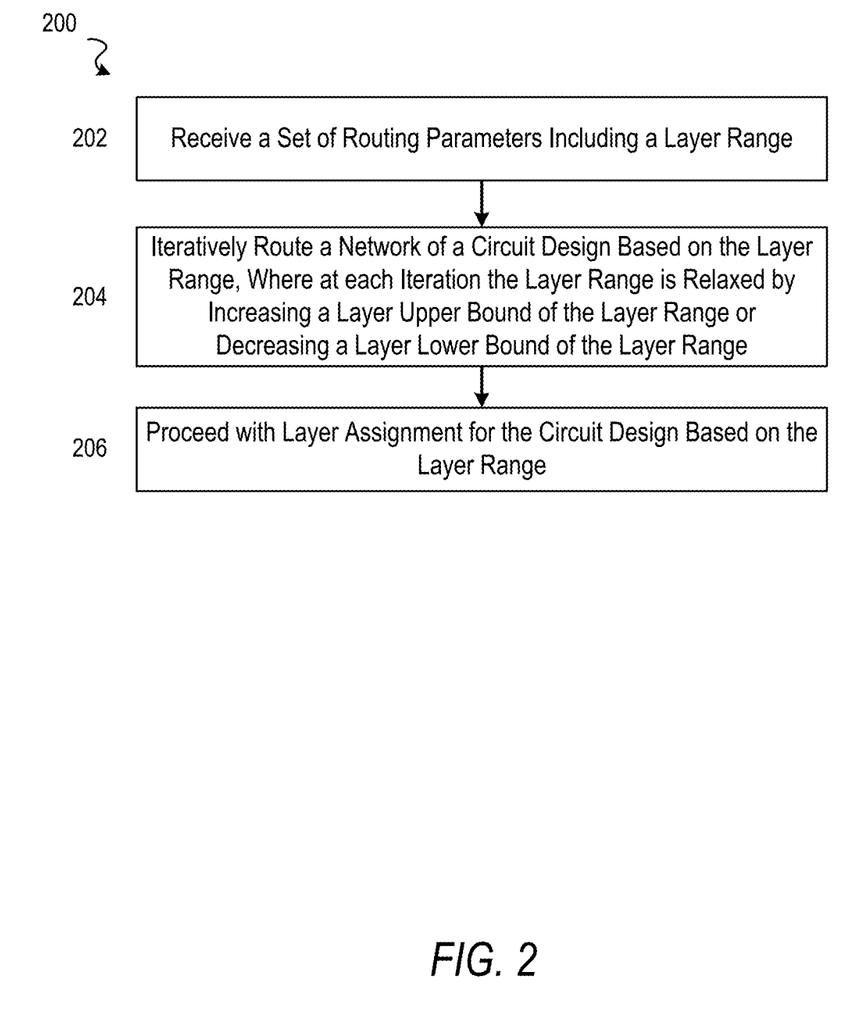
FIGS. 2-4 are flowcharts illustrating example methods for routing a net of a circuit design with multiple layer ranges, according to some embodiments.
Figure 3:
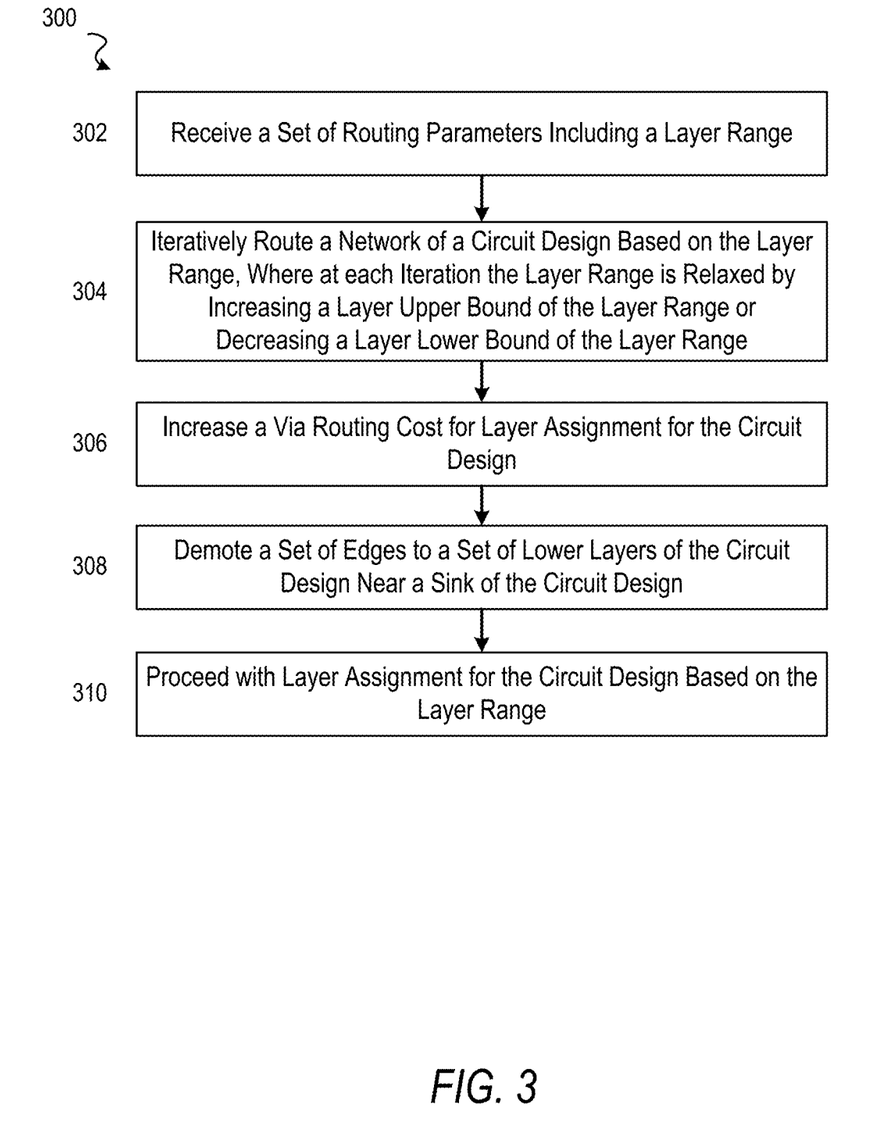
Figure 4:
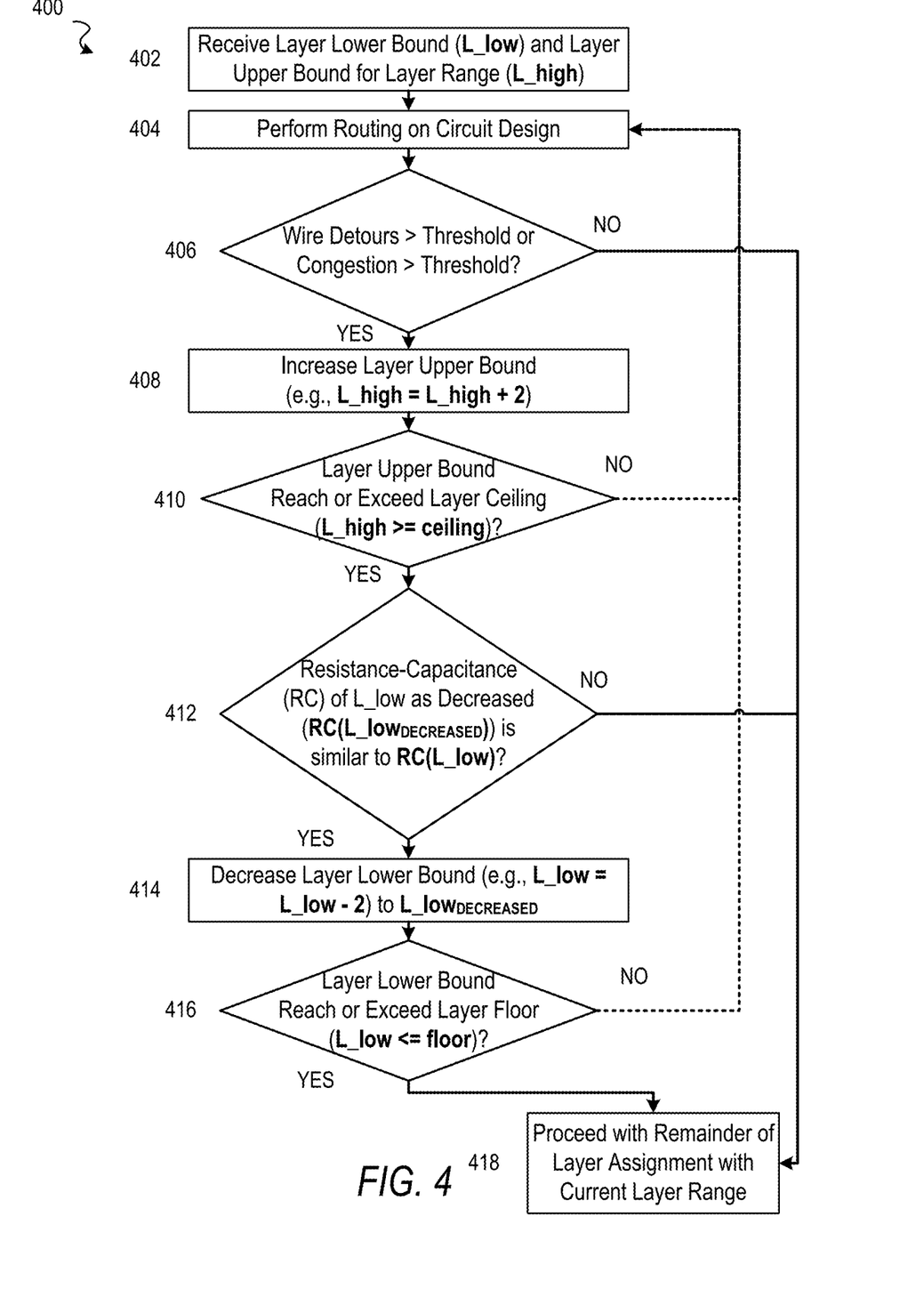

FIGS. 2-4 are flowcharts illustrating example methods for routing a net of a circuit design with multiple layer ranges, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates the example method 200 for routing a net of a circuit design with multiple layer ranges, according to some embodiments. For some embodiments, the method 200 is performed as part of a routing processing or layer assignment process (e.g., of the routing process) applied to a circuit design (e.g., by an EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 receiving a set of routing parameters including a layer range. According to various embodiments, the layer range is defined by at least a layer upper bound, which represents the highest layer to which a wire segment of a net can be assigned by layer assignment, and a layer lower bound, which represents the lowest layer to which a wire segment of the net can be assigned by layer assignment. An example layer upper bound or layer lower bound can be set to a metal layer of a circuit design, such as metal layer two (M2), metal layer three (M3), metal layer four (M4), metal layer five (M5), or metal layer six (M6). For some embodiments, a circuit design includes a non-conductive layer between adjacent metal layers (e.g., M3 and M4), meaning that an increase or decrease of a layer bound (e.g., set to M3) involves two layers (e.g., an increase from M3 to M4 involves an increase by two layers). An example of an initial layer range may comprise M7 (layer lower bound) to M8 (layer upper bound).

For some embodiments, the layer lower bound of the layer range is decreased unless a resistance-capacitance of the layer lower bound is impacted by the decrease. For example, prior to a decrease in the layer lower bound, a first resistance-capacitance of the current layer lower bound may be compared to a second resistance-capacitance of the layer lower bound as it is to be decreased. In this example, the current layer lower bound may be set to the decreased layer lower bound if the first resistance-capacitance and the second resistance-capacitance are found to be similar (e.g., equal). In this way, various embodiments can ensure that the relaxed layer lower bound does not result in an increase in resistance-capacitance.

The method 200 continues with operation 204 iteratively routing a net of a circuit design based on the layer range, where at each iteration, the layer range is relaxed by increasing a layer upper bound of the layer range or decreasing a layer lower bound of the layer range. Routing the net may comprise a two-dimensional (2D) routing process (e.g., global routing process) that routes connections between or among electronic components of the net. According to some embodiments, iteratively routing the net may be based on the layer range and further based on at least one of a wirelength constraint, a wire detour constraint, or a congestion constraint. For instance, a routing result may be produced at each iteration of the iterative routing, and the iterative routing may continue to be performed (i.e., continue with another iteration) as long as at least the current routing result violates a wirelength constraint, the current routing result violates a wire detour constraint, or the current routing result violates a congestion constraint. Violation of each constraint may be based on an associated threshold (e.g., wire detour threshold, wirelength threshold, and congestion threshold).

For instance, where the initial layer range comprises M7 to M8, the wirelength threshold is 62.5, and the initial iteration of the routing of the net results in a wirelength of 150, the layer range may eventually be relaxed by operation 204 to M5 to M10 if the last iteration of the routing of the net results in a wirelength of 60, which causes the wirelength to be less than the wirelength threshold. Thresholds for one or more constraints may be user-defined or value generated by an EDA tool. At the end of operation 204, the current layer range may be an adjusted version (e.g., relaxed version) of the layer range received via operation 202.

The method 200 continues with operation 206 proceeding with layer assignment for the circuit design based on the layer range after the iterative routing of operation 204. In particular, operation 206 may proceed with final stages of the layer assignment for the net of the circuit design.

Referring now to FIG. 3, the flowchart illustrates an example method 300 for routing a net of a circuit design with multiple layer ranges, according to some embodiments. Like the method 200 of FIG. 2, the method 300 may be performed as part of a routing processing or layer assignment process applied to a circuit design. An operation of the method 300 may be performed by a hardware processor.

The method 300 as illustrated begins with operation 302 and continues with operation 304, which according to some embodiments, are respectively similar to operations 202 and 204 of the method 200 described above with respect to FIG. 2.

The method 300 continues with operation 306 increasing a via routing cost for layer assignment for the circuit design. In this way, various embodiments can cause the layer assignment stage to prefer assigning edges (e.g., wire segments) of a net of the circuit design to higher layers of the circuit design, which can result in longer continuous edges and improve resistance-capacitance for those edges.

The method 300 continues with operation 308 demoting a set of edges to a set of lower layers of the circuit design near a sink of the circuit design. Doing so can enable some embodiments to improve a net associated with the set of edges with respect to via, capacitance, slew, latency, power usage, or congestion.

Certain embodiments facilitate the layer demotion by performing, with respect to a particular net (e.g., clock net), a number-labeling algorithm comprising: ordering all edges of the particular net in topology order; for each particular edge, in reverse topology order, if the particular edge connects to a sink, setting a cost of the particular edge to one (i.e., cost(E)=1), or otherwise setting the cost of the particular edge to a maximum cost of all children edges plus one (i.e., cost(E)=max cost of all children+1); and for each given edge, if the cost of the given edge is less than a threshold (i.e., cost(E)<threshold), downgrading the given edge to a lower layer. The threshold may be determined, for example, based on tuning associated with a technology (e.g., fab size, such as 14 nm), based on testing/experimentation, or based on a preferred edge length relative to the standard cell layout (e.g., five or eight circuit rows). An example threshold may comprise, for instance, a threshold of six. The threshold may be one that is user-defined (e.g., defined by a designer) or set by default (e.g., by an EDA software system). More regarding application of this algorithm is discussed with respect to FIG. 7.

The method 300 continues with operation 310, which according to some embodiments, is similar to operation 206 of the method 200 described above with respect to FIG. 2.

Referring now to FIG. 4, the flowchart illustrates an example method 400 for routing a net of a circuit design with multiple layer ranges, according to some embodiments. Like the method 200 of FIG. 2, the method 400 may be performed as part of a routing processing or layer assignment process applied to a circuit design. An operation of the method 400 may be performed by a hardware processor.

The method 400 as illustrated begins with operation 402 receiving a layer lower bound and a layer upper bound. With respect to FIG. 4, L_low represents the current layer lower bound and L_high represents the current layer upper bound. As described herein, the layer lower bound and the layer upper bound may define a layer range used by a routing process (e.g., routing a net of a circuit design) or, more specifically, layer assignment (e.g., of wires) for a circuit design. According to some embodiments, operation 402 represents receiving the initial layer upper and lower bounds of an initial layer range, which may be adjusted (e.g., the layer upper bound may be increased or the layer lower bound decreased) by subsequent operations of the method 400.

The method 400 continues with operation 404 performing routing on the circuit design, which may involve routing a net (e.g., a clock net) of the circuit design.

The method 400 continues with operation 406, which determines whether wire detours present in a routing result from operation 404, or congestion present in the routing result from operation 404, surpasses a respective threshold (i.e., wire detour threshold and congestion threshold). If either of these conditions is true (i.e., YES), the method 400 continues with operation 408; otherwise, both are not true (i.e., NO), and the method 400 continues to operation 418.

Operation 408 of the method 400 increases the current layer upper bound of the layer range (e.g., sets L_high=L_high+2, which increases the layer upper bound by 2 layers). Depending on the embodiment, the current layer upper bound of the layer range may be increased by amounts of one or more (e.g., 1 or 3). After operation 408, the method 400 continues with operation 410, which determines whether the current layer upper bound, resulting from operation 408, has reached or exceeded a layer ceiling of the circuit design. For various embodiments, the layer ceiling of the circuit design represents the highest conductive layer (e.g., metal layer) of the circuit design, or highest conductive layer available to the method 400. If the current layer upper bound has reached the layer ceiling of the circuit design (i.e., YES), the current layer upper bound remains at the layer ceiling and the method 400 continues with operation 412. If the current layer upper bound has not reached the layer ceiling of the circuit design (i.e., NO), the method 400 returns to operation 404, where another iteration of routing on the circuit design is performed with the layer range as further relaxed by the current layer upper bound produced by operation 408. Based on the routing results of that iteration (e.g., as checked by operation 406), operations 408-416 may relax the layer range even further, and one or more additional iterations of routing on the circuit design may be performed.

Operation 412 of the method 400 determines whether a resistance-capacitance (RC) of the current layer lower bound as decreased ($RC(L\_low_{decreased})$) is similar to a RC of the current layer lower bound ($RC(L\_low)$). The current layer lower bound as decreased ($L\_low_{decreased}$) may be equal to, for example, the current layer lower bound (L_low) decreased by two layers ($L\_low_{decreased}$=L_low−2). Depending on the embodiment, the current layer lower bound of the layer range may be decreased by amounts of one or more (e.g., 1 or 3). If $RC(L\_low_{decreased})$ is similar to $RC(L\_low)$ (i.e., YES), the method 400 continues to operation 414. If $RC(L\_low_{decreased})$ is not similar to $RC(L\_low)$ (i.e., NO), the current layer lower bound remains as-is and the method 400 continues to operation 418.

Operation 414 of the method 400 decreases the current layer lower bound of the layer range (e.g., sets L_low=Low−2, which decreases the layer lower bound by 2 layers). As shown, operation 414 decreases the current layer lower bound to $L\_low_{decreased}$, for which RC was compared to $RC(L\_low)$ at operation 412.

After operation 414, the method 400 continues to operation 416, which determines whether the current layer lower bound, resulting from operation 414, has reached or exceeded a layer floor (e.g., bottom) of the circuit design. For various embodiments, the layer floor of the circuit design represents the lowest conductive layer (e.g., metal layer) of the circuit design, or lowest conductive layer available to the method 400 (e.g., metal layer three (M3), where metal layers one (M1) or two (M2) are typically utilized for pin access to sink cells by a routing process). If the current layer lower bound has reached the layer floor of the circuit design (i.e., YES), the current layer lower bound remains at the layer floor and the method 400 continues with operation 418. If the current layer lower bound has not reached the layer floor of the circuit design (i.e., NO), the method 400 returns to operation 404, where another iteration of routing on the circuit design is performed with the layer range as further relaxed by the current layer lower bound produced by operation 414.

Operation 418 of the method 400 proceeds with the remainder (e.g., final stages) of layer assignment for the circuit design using the layer range as defined by the current layer upper bound and the current layer lower bound.

Figure 5:
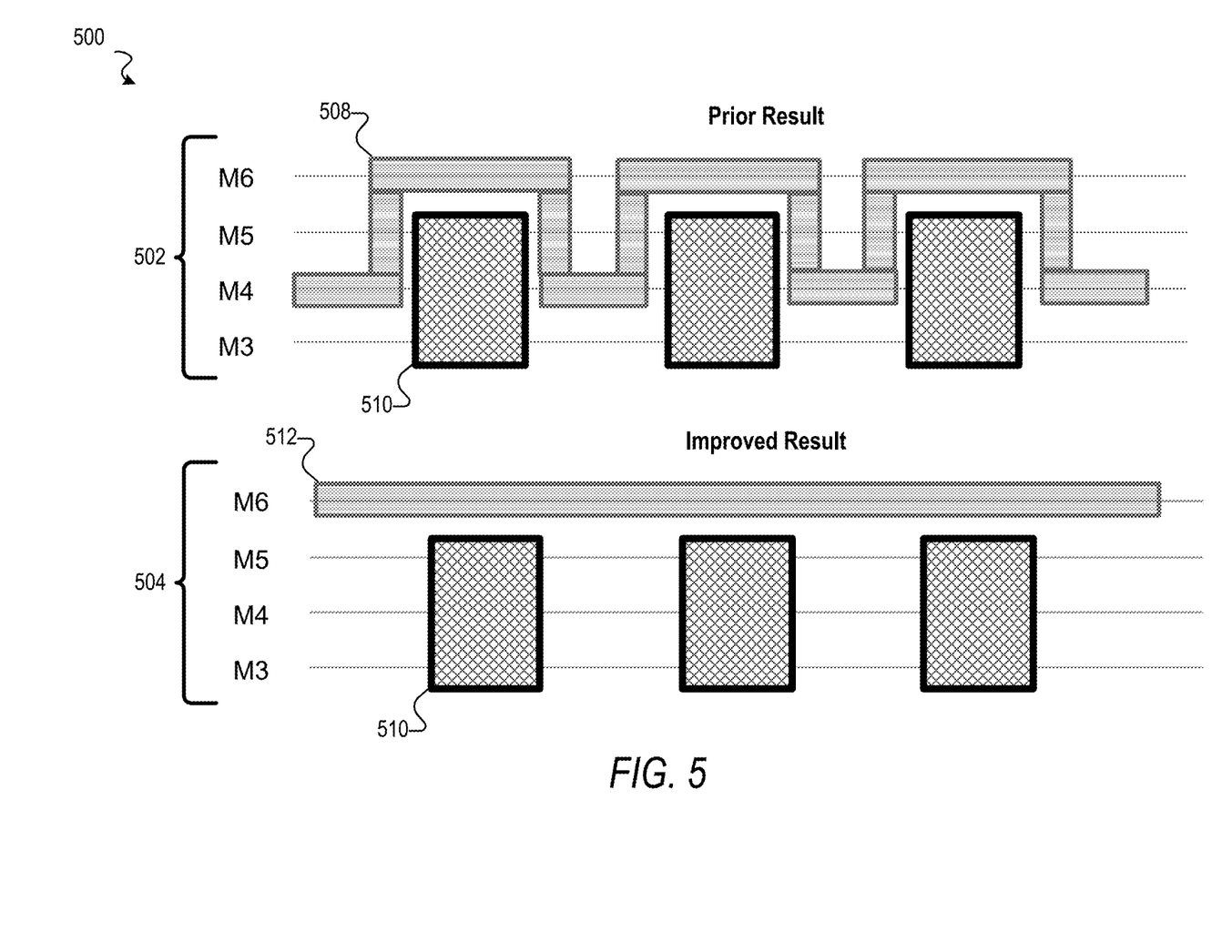
FIGS. 5-6 are sets of circuit diagrams that compare example layer assignments, for nets of circuit designs, produced by traditional methods against example layer assignments, for the same nets, produced by methods of some embodiments.

FIG. 5 is a set of circuit diagrams 500 that compares an example layer assignment 502, for a net of a circuit design, as produced by a traditional method, against an example layer assignment 504, for the same net, produced by a method of some embodiments described herein. In particular, the set of circuit diagrams 500 provides an elevation view of the layers of a particular circuit design after a wire of a net (of the particular circuit design) is routed and its wire segments are assigned to layers. According to some embodiments, the layer assignment 504 for the circuit design is produced by layer assignment for the circuit design where a layer range is gradually relaxed, such as by the method 200 of FIG. 2, the method 300 of FIG. 3, or the method 400 of FIG. 4.

As shown, the layer assignment 502 produced by conventional means assigns a set of wire segments 508 of a wire to metal layer four (M4), and detours up to metal layer six (M6) to avoid a plurality of obstacles 510. The conventional means that produced the layer assignment 502 may have used a layer range of metal layer three (M3) to M4. In comparison, the layer assignment 504 produced by an embodiment assigns a wire segment 512 of the same wire to metal layer six (M6) to avoid the plurality of obstacles 510, thereby obviating the need for wire detours and reducing wirelength of the wire. As described herein, the embodiment that produced the layer assignment 504 may have used an initial layer range of M3 to M4 and, subsequently, relaxed the layer upper bound from M4 to M6, thereby resulting in the layer range being M3 to M6.

Figure 6:
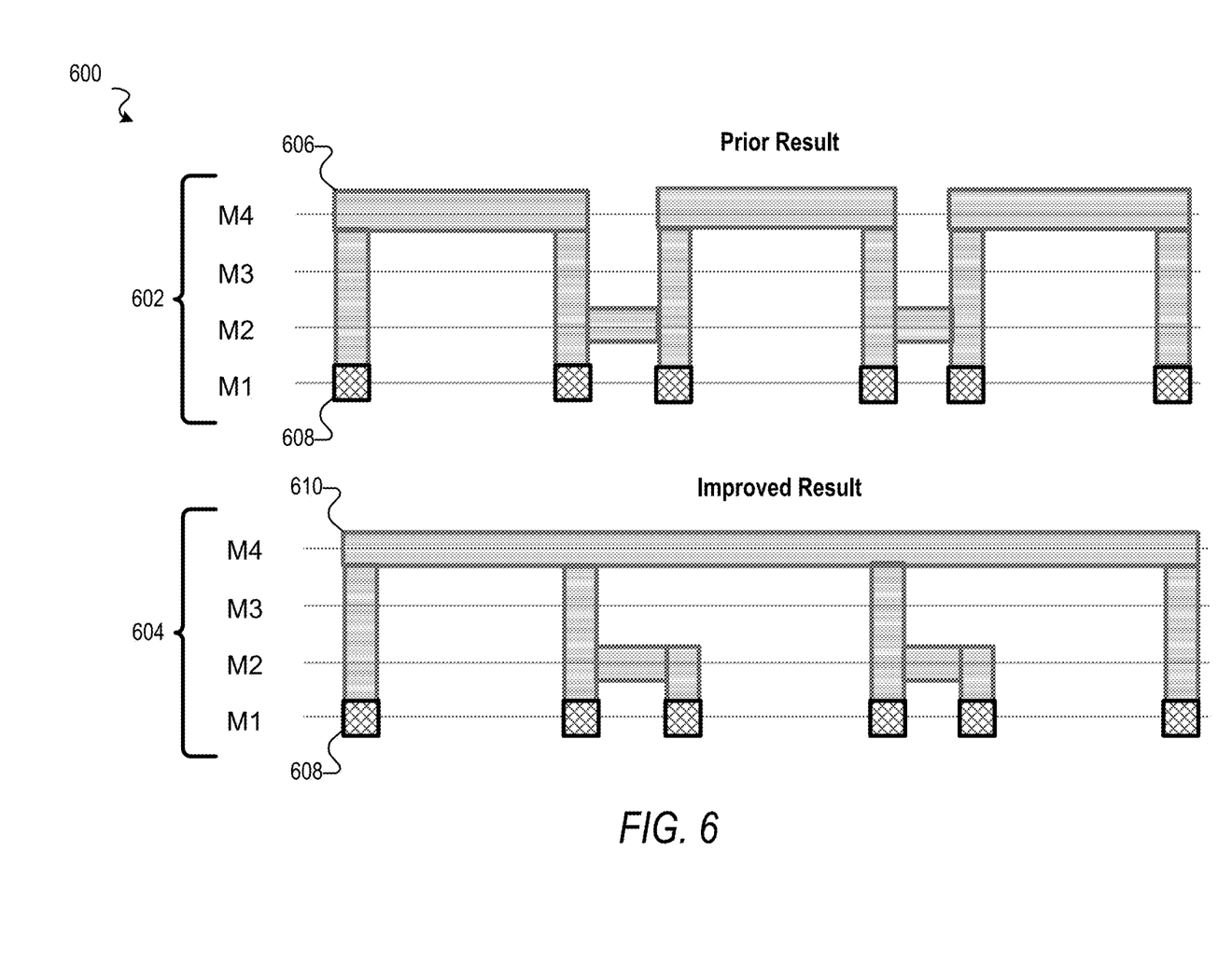

FIG. 6 is a set of circuit diagrams 600 that compares an example layer assignment 602, for a net of a circuit design, as produced by a traditional method, against an example layer assignment 604, for the same net, produced by a method of some embodiments described herein. In particular, the set of circuit diagrams 600 provides an elevation view of the layers of a particular circuit design after a wire of a net (of the particular circuit design) is routed and its wire segments are assigned to layers. According to some embodiments, the layer assignment 604 is produced by layer assignment for the circuit design where a via routing cost is increased, such as by the method 300 of FIG. 3. Increasing the via routing cost can cause the layer assignment to prefer assigning wire segments of a net of the circuit design to higher layers of the circuit design, which can result in longer continuous wire segments.

As shown in FIG. 6, each of the layer assignments 602 and 604 includes a set of sinks 608 (e.g., clock sinks) on metal layer one (M1), the layer assignment 602 includes a set of wire segments 606 of a wire of a net (e.g., clock net), and the layer assignment 604 includes a set of wire segments 610 of a wire of a net. As shown, for the layer assignment 604, the portion of the wire segments 610 assigned to metal layer four (M4) is continuous and assigned to the highest metal layer. In comparison, for the layer assignment 602, multiple portions of the wire segments 606 are assigned to M4 and fragmented. Additionally, even though the layer assignment 602 results in a shorter wirelength than does the layer assignment 604, the layer assignment 604 results in better resistance-capacitance by preferring the higher layers of the circuit design, which in turn results in improved wire performance.

Figure 7:
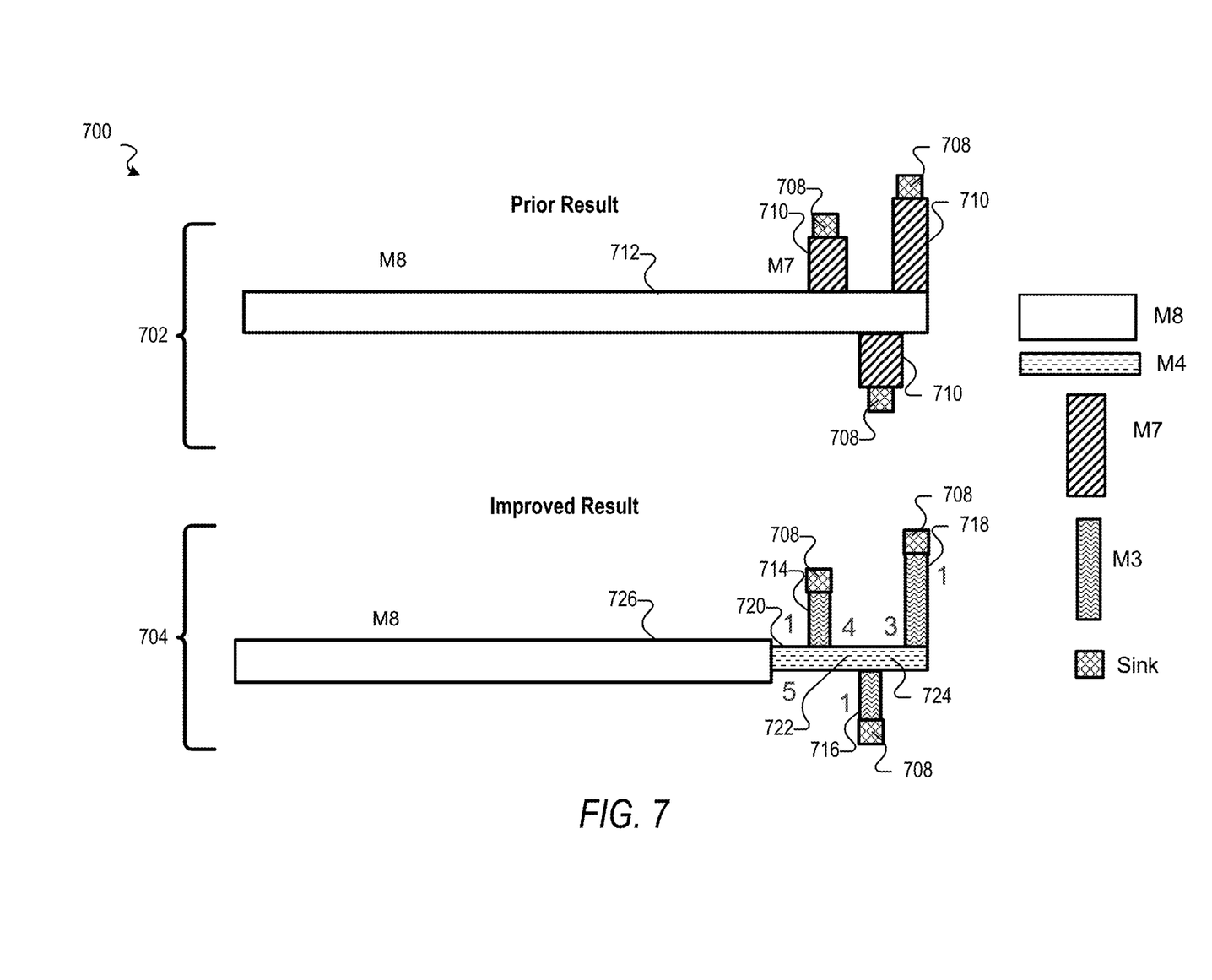
FIG. 7 is a set of circuit diagrams that compares an example wire routing and layer assignment, for a net of a circuit design, produced by a traditional method against an example wire routing and layer assignment, for the same net, produced by a method of some embodiments.

FIG. 7 is a set of circuit diagrams 700 that compares an example wire routing and layer assignment 702 for a net of a circuit design, as produced by a traditional method, against an example wire routing and layer assignment 704 for the same net, produced by a method of some embodiments described herein. Specifically, the set of circuit diagrams 700 provides a top view of wire routing and associated layer assignments for the net after the wires of the net are routed and their wire segments (edges) are assigned to layers. According to some embodiments, the routing and layer assignment 704 is produced by layer assignment for the net by demotion of edges of the net to lower layers near sinks 708, such as by operation 308 of the method 300 of FIG. 3.

The wire routing and layer assignment 702 is produced by a traditional method using a layer range that comprises at least the layers M7 and M8 (e.g., a layer range of M7 to M8). As shown, for the wire routing and layer assignment 702, a circuit component (not shown), such as a driver, is coupled to the set of sinks 708 through a wire edge 712 assigned to M8, and a set of wire edges 710 assigned to M7.

In contrast, the wire routing and layer assignment 704 is produced by an embodiment that demotes edges near sinks to lower layers as described herein. Accordingly, the wire routing and layer assignment 704 couples a circuit component (not shown) to the set of sinks 708 through an edge 726 assigned to M8, edges 720, 722, and 724 assigned to M4, and edges 714, 716, and 718 assigned to M3. For some embodiments, the wire routing and layer assignment 704 may be produced from the wire routing and layer assignment 702 by first ordering all edges of the net represented by the wire routing and layer assignment 702 in topology order, which results in the order being the wire edges 710, and then the wire edge 712. Next, for each particular edge, in reverse topology order (i.e., the wire edge 712 and then the wire edges 710), if the particular edge connects to a sink, the cost of the particular edge is set to one (i.e., cost(E)=1), and if not, the cost of the particular edge is set to the maximum cost of all children edges plus one (i.e., cost(E)=max cost of all children+1). This results in the edges 714, 716, and 718 being set with an edge cost of one, while the edges 720, 722, and 724 are set to five, four, and three, respectively, which represent the maximum costs of their respective children edges plus one. Subsequently, for each given edge, if the cost of the given edge is less than a threshold (i.e., cost(E) <threshold), the given edge is downgraded to a lower layer. Assuming a threshold of six, this results in the edges 714, 716, and 718 being downgraded (e.g., demoted) from M7 to M3, which represents the lowest available layer nearest the set of sinks 708, and results in the edges 720, 722, and 724 being downgraded from M8 to M4, which represents the lowest available layer above M3.

Figure 8:
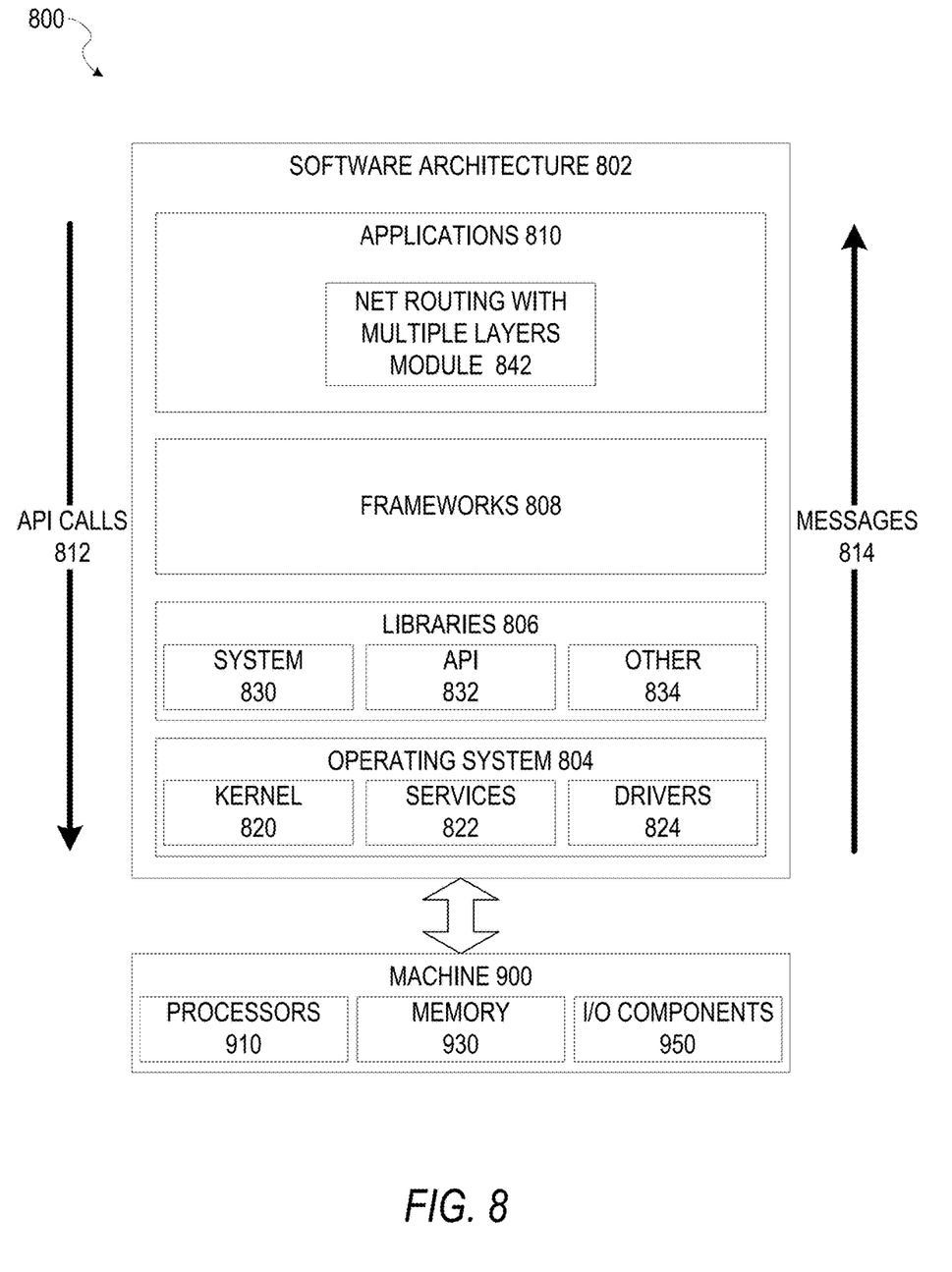
FIG. 8 is a block diagram illustrating an example of a software architecture that may be operating on an electronic design automation (EDA) computing device and may be used with methods for routing a net of a circuit design with multiple layer ranges, according to some embodiments.

FIG. 8 is a block diagram 800 illustrating an example of a software architecture 802 that may be operating on an EDA computer and may be used with methods for routing a net of a circuit design with multiple layer ranges, according to some example embodiments. The software architecture 802 can be used as an EDA computing device to implement any of the methods described above. Aspects of the software architecture 802 may, in various embodiments, be used to store circuit designs, and to route nets using multiple layer ranges in an EDA environment to generate circuit designs, from which physical devices may be generated.

FIG. 8 is merely a non-limiting example of a software architecture 802, and it will be appreciated that many other architectures can be implemented to facilitate the functionality described herein. In various embodiments, the software architecture 802 is implemented by hardware such as a machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, software frameworks 808, and applications 810. Operationally, the applications 810 invoke application programming interface (API) calls 812 through the software stack and receive messages 814 in response to the API calls 812, consistent with some embodiments. In various embodiments, any client device, any server computer of a server system, or any other device described herein may operate using elements of the software architecture 802. An EDA computing device described herein may additionally be implemented using aspects of the software architecture 802, with the software architecture 802 adapted for operating to perform routing a net of a circuit design in any manner described herein.

Figure 9:
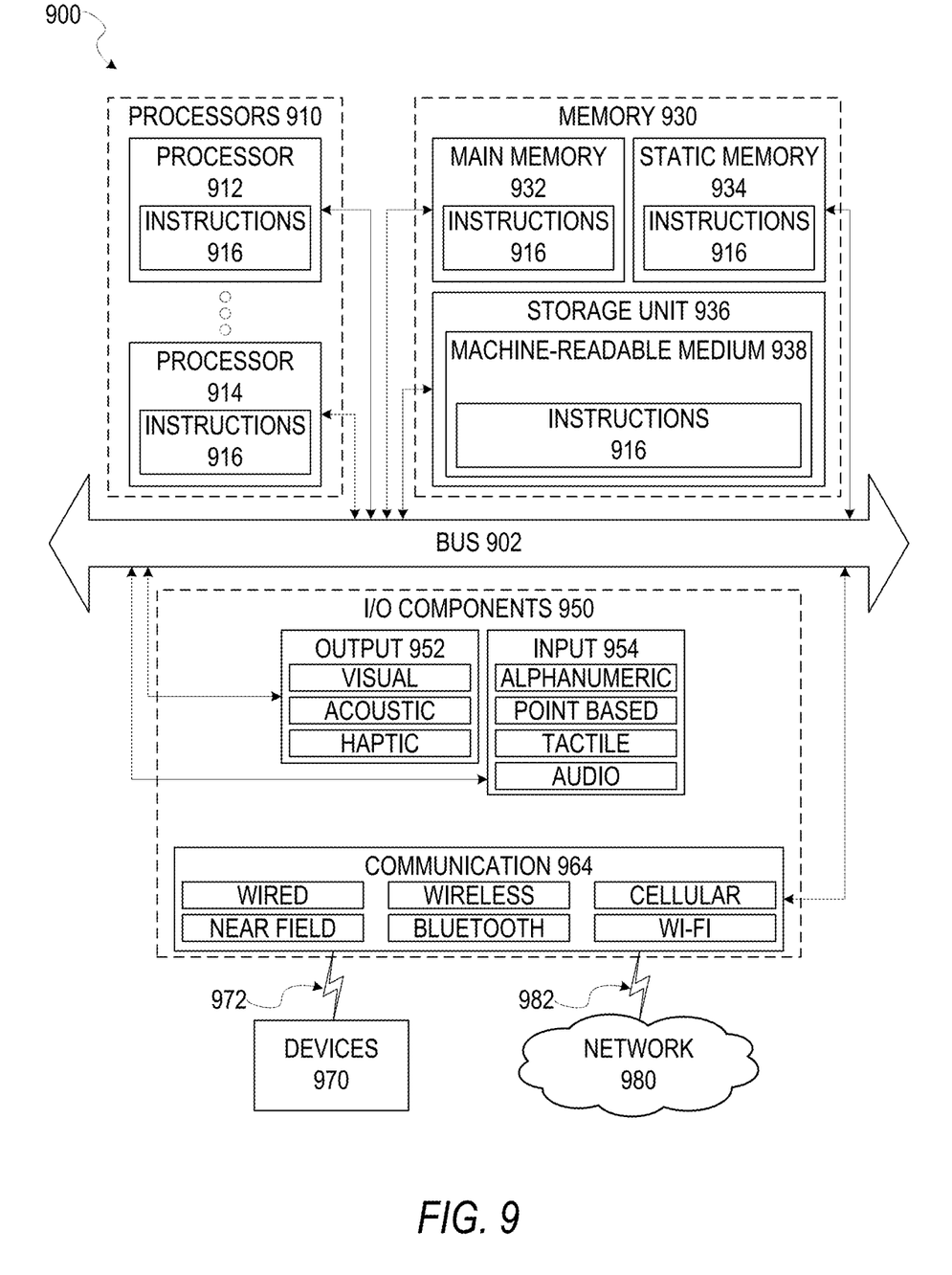
FIG. 9 is a diagram representing a machine in the form of a computer system within which a set of instructions are executed, causing the machine to perform any one or more of the methods discussed herein, according to some example embodiments.

In one embodiment, an EDA application of the applications 810 performs net routing with multiple layer ranges according to embodiments described herein using various modules within the software architecture 802. For example, in one embodiment, an EDA computing device similar to the machine 900 includes the memory 930 and the one or more processors 910. The processors 910 also implement a net routing with multiple layers module 842 for routing a net of a circuit design with multiple layer ranges in accordance with various embodiments described herein.

In various other embodiments, rather than being implemented as modules of the one or more applications 810, the net routing with multiple layers module 842 may be implemented using elements of the libraries 806, the operating system 804, or the software frameworks 808.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of blocks for use in an EDA environment or other libraries that can provide functions such as memory allocation functions, string manipulation functions, mathematic functions, and the like. In addition, the libraries 806 can include API libraries 832 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphic user interface (GUI) functions, high-level resource management, high-level location services, and so forth. The software frameworks 808 can provide a broad spectrum of other APIs that can be utilized by the applications 810, some of which may be specific to a particular operating system 804 or platform. In various embodiments, the systems, methods, devices, and instructions described herein may use various files, macros, libraries, and other elements of an EDA design environment to implement net routing with multiple layer ranges as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 802, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations.

FIG. 9 is a diagrammatic representation of the machine 900 in the form of a computer system within which a set of instructions may be executed for causing the machine 900 to perform any one or more of the methodologies discussed herein, according to an example embodiment. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., the instructions 916) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a USB).

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

Furthermore, the machine-readable medium 938 is non-transitory (in other words, not having any transitory signals) in that it does not embody a propagating signal. However, labeling the machine-readable medium 938 "non-transitory" should not be construed to mean that the machine-readable medium 938 is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
receiving, by a hardware processor, a set of routing parameters including a layer range;
iteratively routing, by an electronic design automatic software system operating using the hardware processor, a network of a circuit design based on the layer range, wherein at each iteration of the iteratively routing, the layer range is relaxed by at least one of increasing a layer upper bound of the layer range or decreasing a layer lower bound of the layer range;
demoting, by the hardware processor, a set of edges of the circuit design to a set of lower layers near a sink of the circuit design by:
setting a cost of at least one edge in the set of edges to a non-zero value in response to the at least one edge connecting to the sink; and
setting a cost of at least another edge in the set of edges to the non-zero value plus a maximum cost of children edges of the at least another edge in response to the at least another edge not connecting to any sink; and
proceeding, by the hardware processor, with layer assignment for the circuit design based on the layer range after the iteratively routing.

2. The method of claim 1, wherein each iteration of the iteratively routing produces a current routing result, and the iteratively routing is performed as long as at least the current routing result violates a wirelength constraint, the current routing result violates a wire detour constraint, or the current routing result violates a congestion constraint.

3. The method of claim 1, wherein the layer range is relaxed by increasing the layer upper bound of the layer range up to a layer ceiling of the circuit design.

4. The method of claim 1, wherein the layer range is relaxed by decreasing the layer lower bound of the layer range down to a layer floor of the circuit design.

5. The method of claim 4, wherein the layer lower bound of the layer range is decreased unless a resistance-capacitance of the layer lower bound is impacted by decreasing the layer lower bound.

6. The method of claim 1, further comprising, prior to the proceeding with the layer assignment, increasing, by the hardware processor, a via routing cost for the layer assignment.

7. The method of claim 1, wherein the demoting the set of edges of the circuit design to the set of lower layers near the sink of the circuit design further by:
for each given edge in the set of edges, demoting the given edge to a lower layer of the circuit design if a cost of the given edge is less than a threshold.

8. The method of claim 1, wherein the iteratively routing the network of the circuit design comprises routing a clock network of the circuit design.

9. A non-transitory computer-readable medium comprising instructions that, when executed by a hardware processor of a device, cause the device to perform operations comprising:
iteratively, by an electronic design automatic software system, routing a network of a circuit design based on a layer range, wherein at each iteration of the iteratively routing, the layer range is relaxed by at least one of increasing a layer upper bound of the layer range or decreasing a layer lower bound of the layer range;
demoting a set of edges of the circuit design to a set of lower layers near a sink of the circuit design by:
setting a cost of at least one edge in the set of edges to a non-zero value in response to the at least one edge connecting to the sink; and
setting a cost of at least another edge in the set of edges to the non-zero value plus a maximum cost of children edges of the at least another edge in response to the at least another edge not connecting to any sink; and
proceeding with layer assignment for the circuit design based on the layer range.

10. The non-transitory computer-readable medium of claim 9, wherein each iteration of the iteratively routing produces a current routing result, and the iteratively routing is performed while the current routing result violates at least one of a wirelength constraint, a wire detour constraint, or a congestion constraint.

11. The non-transitory computer-readable medium of claim 9, wherein the layer range is relaxed by increasing the layer upper bound of the layer range up to a layer ceiling of the circuit design.

12. The non-transitory computer-readable medium of claim 9, wherein the layer range is relaxed by decreasing the layer lower bound of the layer range down to a layer floor of the circuit design.

13. The non-transitory computer-readable medium of claim 12, wherein the layer lower bound of the layer range is decreased unless a resistance-capacitance of the layer lower bound is impacted by decreasing the layer lower bound.

14. The non-transitory computer-readable medium of claim 9, wherein the operations further comprise, prior to the proceeding with the layer assignment, increasing, by the hardware processor, a via routing cost for the layer assignment.

15. The non-transitory computer-readable medium of claim 9, wherein the demoting the set of edges of the circuit design to the set of lower layers near the sink of the circuit design further by:
  for each given edge in the set of edges, demoting the given edge to a lower layer of the circuit design if a cost of the given edge is less than a threshold.

* * * * *